April 15, 1924.

E. KEMP

VEHICLE WHEEL

Filed Nov. 4, 1920

1,490,746

Inventor
Edward Kemp.
By Stanley Lightfoot
Attorney

Patented Apr. 15, 1924.

1,490,746

UNITED STATES PATENT OFFICE.

EDWARD KEMP, OF TORONTO, ONTARIO, CANADA, ASSIGNOR, BY DIRECT AND MESNE ASSIGNMENTS, OF ONE-THIRD TO GEORGE WHITAKER MORLEY AND ONE-THIRD TO CHARLES HEBER RUGGLES, BOTH OF TORONTO, ONTARIO, CANADA.

VEHICLE WHEEL.

Application filed November 4, 1920. Serial No. 421,739.

*To all whom it may concern:*

Be it known that I, EDWARD KEMP, of the city of Toronto, in the county of York, in the Province of Ontario and Dominion of Canada, have made certain new and useful Improvements in Vehicle Wheels, and do hereby declare the following to be a full, clear, and exact description of the same.

This invention relates to vehicle wheels and more particularly to the method of assembling spokes therein having for its object to provide strength and security in the mounting of the spokes on the hub of the wheel and to provide a novel construction of hub in assembling and the combined clamping and drafting of spokes in such assembling.

A still further object is the provision of a plurality of parts comprising a hub, the parts being so co-related with respect to one another and to the spokes that they will exert both radial and lateral pressure against the said spokes the radial pressure gradually increasing until such lateral pressure is effected and a still further object is to effect the locking of such parts by means of the spokes against rotation with respect to one another.

Still further objects subsidiary to or resulting from the aforesaid objects or from the construction or operation of the invention as it may be carried into effect will become apparent as the said invention is hereinafter disclosed.

In carrying the said invention into effect, I may provide in a wheel a plurality of staggered spokes having their outer ends secured to a felloe; a medial hub section, such as an annular ring having recesses in both of the lateral sides thereof adapted to receive the inner ends of the spokes whereby the said spokes will be positioned alternately on either side of the said medial hub section, said recesses being of a depth approximately one-half the diameter or thickness of the ends of the spokes entering the same; a pair of outer hub sections having recesses therein contiguous to the recesses in the medial section and adapted to be positioned on opposite sides thereof, whereby the inner ends of the said spokes will be partly embedded in the medial section and partly in their respective outer sections so that they may be clamped therebetween when the several sections are drawn together; abutments on said spokes to engage the peripheral faces of the said sections, the said sections being so formed as by complementary bevelling that they will exert an outward radial force against the said abutments, and consequently against said spokes when the said parts are drawn together; and means securing the said sections in their assembled relation; all of which is more particularly described and ascertained hereinafter by way of example, having reference to the embodiment of my invention shown in the accompanying drawing, wherein,—

Similar characters of reference indicate similar parts in the several figures of the drawing.

Figures 1, 2:
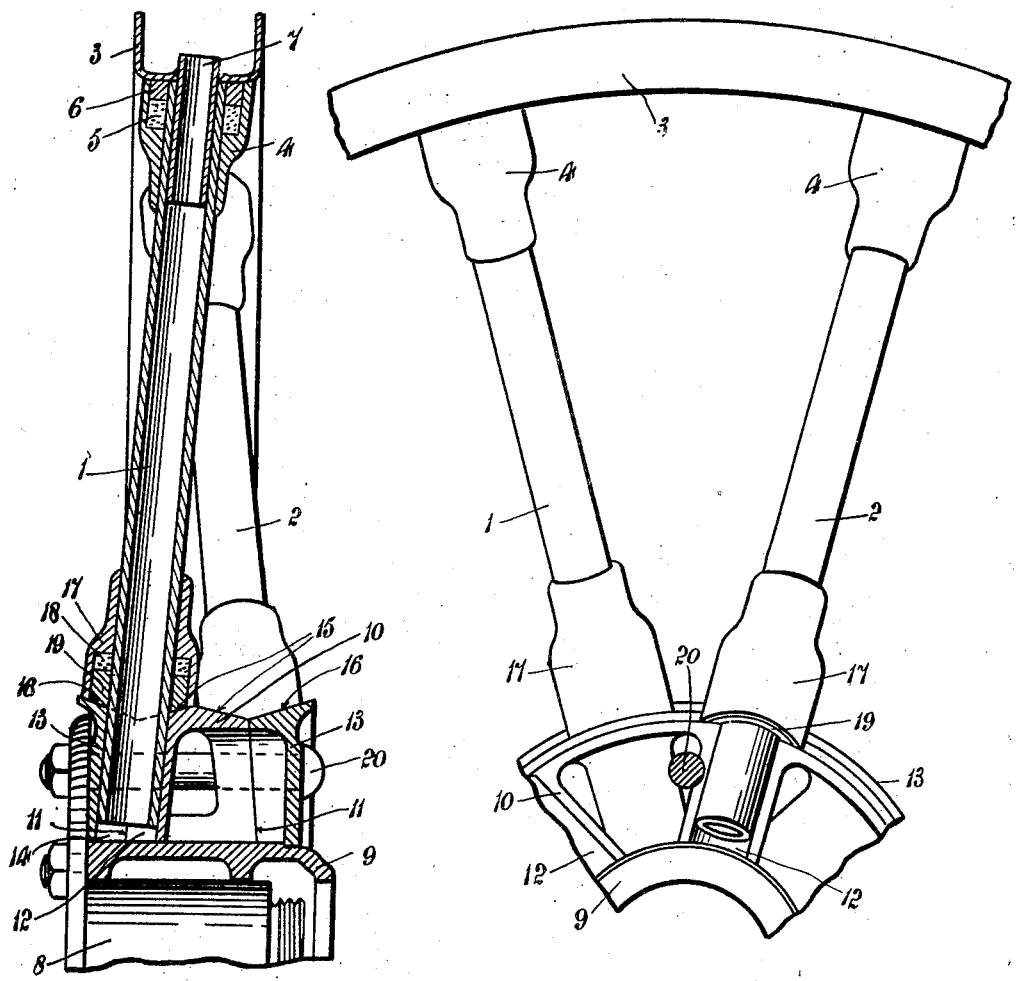
Figure 1 is a vertical section of part of the improved wheel.
Figure 2 is a fragmentary elevation of the same with one of the outer hub sections removed.
Figure 3:
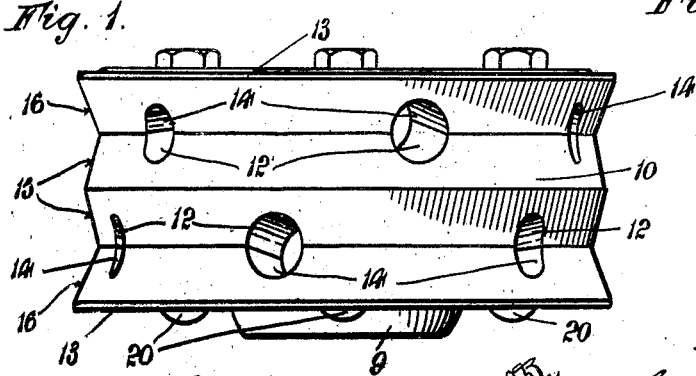
Figure 3 is a plan of the hub.

1 and 2 are spokes of a wheel connected with the felloe 3 and staggered as is well known in wheel construction, 4 being cups or abutments having resilient insulating cushions 5 therein surmounted by closures 6; and 7 represents a tenon entering the felloe 3 whereby the outer ends of the spokes are secured thereto.

8 indicates the shell of a bearing and 9 a sleeve thereover, and mounted upon the said sleeve is a medial hub section 10 the lateral sides 11 of which are bevelled to agree with the staggering of the said spokes; and in each of these sides 11 are recesses 12 accommodating the inner ends of the spokes so that the spokes 1 will be positioned at one side of the said metal hub section and the spokes 2 on the other side thereof. It will be seen that the recesses conform to the shape of the spokes and are of a depth approximately equal to one-half the diameter of the said spokes so that the said spokes will project laterally from the recesses.

A pair of outer hub sections 13 are shown, positioned on either side of the medial hub section 10, and having their opposed faces conforming with the angle of the faces 11 of the said medial hub section, these outer sections being recessed in a similar manner to the medial sections contiguous to the recesses in said medial section whereby complete receiving orifices are formed for the inner ends of the spokes. It will thus be seen that the inner ends of the spokes form connections between the medial and outer sections locking the said sections against rotation with respect to one another, and also that the securing together of the several hub sections will effect the securing of the spokes in position and will therefore, where the recesses are so proportioned, effect the rigid clamping of the spokes between the medial and outer sections.

The medial hub section 10 is shown as being of greater diameter between its peripheral edges than at such edges, by having oppositely bevelled surfaces 15, and the outer sections are also shown as having complementary bevelled surfaces 16 whereby annular depressions are formed at the meeting edges of the said sections.

17 are abutments on the spokes, the inner faces of said abutments being bevelled to conform with the bevelled faces 15 and 16 of the medial and outer hub sections, and the said abutments may have resilient insulating cushions 18 therein enclosed by closures 19 which closures may be similarly bevelled.

It will be readily apparent that, in the assembling of a wheel as described, the tenons of the spokes may be properly juxtaposed with the felloe of the wheel and the inner ends of the said spokes brought opposite to and more or less entered into the recesses 12 of the medial hub section, after which the hub sections may be applied to the spokes with the recesses of said sections 13 properly positioned with respect to the said spokes, after which the said outer sections may be drawn inwardly towards the medial sections whereupon the bevelled peripheral faces of the sections will engage the bevelled faces of the abutments 17 of the spokes and exert a radial pressure thereon, such radial pressure increasing as the hub sections are drawn closer together, whereby the abutments 4 will be forced into their desired relation to the felloe and draft given to the wheel. It will also follow that, if the drawing together of the sections be continued and the recesses proportioned for that purpose the inner ends of the spokes will be clamped between the sections and so further secured.

It will be therefore seen that where the resilient cushions are used such as illustrated the method of assembling will effect the compression of the cushions.

Bolts 20 are shown for the purpose of locking the parts in their assembled relation and may be also used for the purpose of effecting the closing of the sections upon one another.

This invention may be developed within the scope of the following claims without departing from the essential features of the said invention and it is desired that the specification and drawings be read as being merely illustrative and not in the limiting sense except as necessitated by the prior art.

What I claim as my invention is:

1. A wheel including a felloe, spokes connected therewith, the spokes having abutments thereon and a hub consisting of three sections having complementary beveled surfaces and complementary recesses formed in their adjacent edges adapted to register with one another said recesses adapted to receive the inner ends of the spokes and the complementary beveled surfaces in position to impinge against the abutments on the spokes, means for clamping the hub sections against the spokes and for causing the beveled surfaces to exert an outward pressure upon the abutments on the spokes and resilient insulating cushions interposed between the abutments and the beveled surfaces of the hub sections.

2. A wheel including a felloe, spokes connected therewith, the spokes having abutments thereon and a hub consisting of three sections having complementary beveled surfaces and complementary recesses formed in their edges adapted to register with one another said recesses adapted to receive the inner ends of the spokes and the complementary beveled surfaces in position to impinge against the abutments on the spokes, means for clamping the hub sections together against the spokes and for causing the beveled surfaces to exert an outward pressure upon the abutments on the spokes, and resilient insulating cushions interposed between the abutments on the spokes and the felloe, and between the abutments and the beveled surfaces on the sections of the hub.

3. A wheel including a felloe, spokes connected therewith, the spokes having abutments intermediate of their ends, said abutments provided with annular grooves adapted to receive a resilient insulating cushioning means, and a hub consisting of three sections having complementary beveled surfaces and complementary recesses formed in their edges adapted to register with one another said recesses adapted to receive the inner ends of the spokes and the complementary beveled surfaces in position to impinge against the abutments on the spokes, means for clamping the hub sections together against the spokes and for causing the beveled surfaces of the spokes and hub to exert an outward pressure upon the abutments of the spokes and the felloe and between the abutments and the beveled surfaces on the sections of the hub.

Signed at the city of Toronto, in the county of York, Province of Ontario and Dominion of Canada, this 30th day of October, 1920.

EDWARD KEMP.